(12) United States Patent
Rong et al.

(10) Patent No.: US 12,222,283 B2
(45) Date of Patent: Feb. 11, 2025

(54) ONLINE VACUUM DEGREE DETECTION SYSTEM AND METHOD BASED ON SINGLE-FIBER LASER-INDUCED BREAKDOWN SPECTROSCOPY

(71) Applicant: XI'AN JIAOTONG UNIVERSITY, Shaanxi (CN)

(72) Inventors: Mingzhe Rong, Shaanxi (CN); Jiaqi Liu, Shaanxi (CN); Feilong Zhang, Shaanxi (CN); Wei Ke, Shaanxi (CN); Minyuan Chen, Shaanxi (CN); Huan Yuan, Shaanxi (CN); Aijun Yang, Shaanxi (CN); Dingxin Liu, Shaanxi (CN); Xiaohua Wang, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 62 days.

(21) Appl. No.: 17/885,230

(22) Filed: Aug. 10, 2022

(65) Prior Publication Data
US 2023/0243740 A1      Aug. 3, 2023

(30) Foreign Application Priority Data
Jan. 28, 2022   (CN) .......................... 202210108994.3

(51) Int. Cl.
G01N 21/25    (2006.01)
G01N 21/39    (2006.01)

(52) U.S. Cl.
CPC ........... *G01N 21/255* (2013.01); *G01N 21/39* (2013.01)

(58) Field of Classification Search
CPC .. G01N 21/255; G01N 21/39; G01N 2201/08; G01N 21/718
See application file for complete search history.

(56) References Cited

U.S. PATENT DOCUMENTS

| | | | | |
|---|---|---|---|---|
| 5,751,416 A | * | 5/1998 | Singh ...................... | G01J 3/021 356/417 |
| 8,054,454 B2 | * | 11/2011 | Treado ...................... | G01J 3/02 356/73 |
| 10,782,477 B2 | * | 9/2020 | Van Zuylen ........... | A61B 18/22 |
| 2003/0174325 A1 | * | 9/2003 | Zhang ................... | G01N 21/718 356/318 |

\* cited by examiner

*Primary Examiner* — Tarifur R Chowdhury
*Assistant Examiner* — Kemaya Nguyen

(57) ABSTRACT

Disclosed are an online vacuum degree detection system and method based on single-fiber laser-induced breakdown spectroscopy. In the system, a laser device generates laser that excites the laser through fiber induced breakdown spectroscopy; a fiber coupler couples and injects the laser; a single fiber is connected to the fiber coupler to transmit the laser; one end of an LIBS probe is connected to the single fiber, and the other end of the LIBS probe extends into a vacuum arc-extinguishing chamber; the laser is induced by the LIBS probe to generate plasma, and the plasma is subjected to self-emission imaging and enters the fiber coupler via the LIBS probe; a dichroscope is arranged on the fiber coupler to separate the laser from the plasma; a processor is connected to a camera and a spectrometer.

3 Claims, 2 Drawing Sheets

| Coupling and injecting, by the fiber coupler, laser into the single fiber and transmitting the injected laser to the LIBS probe to excite the shield of the arc-extinguishing chamber in the vacuum switch to induce generation of plasma |

⇓

| Enabling the plasma to be subjected to self-emission imaging and to enter the fiber coupler via the LIBS probe, separating, by the dichroscope, the laser from the plasma, and collecting, by the collection fiber, the plasma via the achromatic instrument |

⇓

| Triggering, by the digital delay pulse generator, the laser and the camera, adjusting a time interval to track the evolution of the plasma, and obtaining, by the camera and the spectrometer, a plasma image and a spectral signal |

⇓

| Generating, by the processor, a plasma temperature and a plasma density based on the plasma image and the spectral signal, so as to obtain a vacuum degree |

Fig. 2

ONLINE VACUUM DEGREE DETECTION SYSTEM AND METHOD BASED ON SINGLE-FIBER LASER-INDUCED BREAKDOWN SPECTROSCOPY

CROSS-REFERENCE TO RELATED APPLICATION

This application claims priority from the Chinese patent application 2022101089943 filed Jan. 30, 2020, the content of which is incorporated herein in the entirety by reference.

TECHNICAL FIELD

The present disclosure belongs to the field of laser detection, and particularly relates to an online vacuum degree detection system and method based on single-fiber laser-induced breakdown spectroscopy.

BACKGROUND

Compared with an air switch, an oil switch, etc., a vacuum switch has the advantages of low failure rate, compact structure, high breaking capacity, easy maintenance, and the like, and is widely used in power systems, coal mining, petrochemistry, and other fields. Its principle is to seal dynamic and static contacts used for current breaking in a vacuum environment, and the insulation performance and arc extinguishing performance of vacuum are used to achieve the purpose of circuit breaking. In practice, as the durable years decrease, the internal vacuum degree of the vacuum switch will gradually decrease due to factors such as aging of the mechanical parts of the vacuum switch and deterioration of the insulation. For the safety of use of the device, detection for the vacuum degree should not be underestimated. At present, mature technologies include: a shield color determination method, an arc observation method, a spark meter method, a getter film method, an arc voltage/current method, a power frequency withstand voltage method, a magnetron discharge method, an emission current attenuation method, an X-ray method, and the like, but they are all offline detection technologies, which require equipment to be out of a running state. In view of the lack of effective online detection methods for a vacuum degree of a vacuum arc-extinguishing chamber at present.

A laser-induced breakdown spectroscopy (LIBS) system focuses a laser beam directly on a sample, without any limitation. With the development of an optical fiber technology, by flexibly transmitting a laser beam to a target through a transmission fiber, long-distance transmission of laser pulses and emission signals can be achieved. This method has the opportunity to break through the limitations of laboratory researches, and adapts to a complex equipment layout and harsh environment. An effective solution is provided for more efficient and accurate analysis of a precise instrument and remote and online detection of a vacuum degree of switch equipment. However, the existing fiber LIBS system has low transmitted laser power, low transmission efficiency and small spectral signal-to-noise ratio, resulting in low measurement accuracy.

The above-mentioned information disclosed in the background is only for enhancing the understanding of the background of the present disclosure, and therefore may contain information that does not form the prior art that is well-known to a person of ordinary skill in the art in this country.

SUMMARY

For the problems in the prior art, the present disclosure provides an online vacuum degree detection system and method based on single-fiber laser-induced breakdown spectroscopy, which can improve the laser focusing degree, increase the laser pulse stability, and reduce deficiencies such as noise interference.

The objective of the present disclosure is achieved by the following technical solutions: an online vacuum degree detection system based on single-fiber laser-induced breakdown spectroscopy includes:

a laser device, which generates laser that excites the laser through fiber induced breakdown spectroscopy;

a fiber coupler, which couples and injects the laser;

a single fiber, which is connected to the fiber coupler to transmit the laser;

an LIBS probe, one end of which is connected to the single fiber, and the other end of which extends into a vacuum arc-extinguishing chamber, wherein the laser is conducted by the fiber and is induced by the LIBS probe to generate plasma, and the plasma is subjected to self-emission imaging and enters the fiber coupler via the LIBS probe;

a dichroscope, which is arranged on the fiber coupler to separate the laser from the plasma;

an achromatic instrument, which is connected to the fiber coupler;

a collection fiber, which is connected to the achromatic instrument to collect the plasma;

a spectrometer, which is connected to the collection fiber to generate a spectral signal;

An intensified charged couple device (ICCD) camera, which is connected to the spectrometer to collect a plasma image;

a digital delay pulse generator, which is connected to the ICCD camera to control the ICCD camera by means of setting a delay between pulses; and a processor, which is connected to the camera and the spectrometer, wherein a plasma temperature and a plasma density are generated based on the plasma image and the spectral signal, so as to obtain a vacuum degree.

In the online vacuum degree detection system based on single-fiber laser-induced breakdown spectroscopy, the energy of the laser generated by the laser device is 24 mJ, and a wavelength is set to 1,064 nm.

In the online vacuum degree detection system based on single-fiber laser-induced breakdown spectroscopy, a central glass core of the single fiber has a core diameter of 400 µm-600 µm; a material of a core layer of the single fiber adopts $GeO_2$ or $SiO_2$; and a material of a cladding layer of the single fiber adopts $SiO_2$.

In the online vacuum degree detection system based on single-fiber laser-induced breakdown spectroscopy, the LIBS probe is a single-lens-based LIBS laser probe; during focusing, laser spots are focused and emitted through a lens to a shield target material of an arc-extinguishing chamber in a vacuum switch to generate plasma.

A detection method using the online vacuum degree detection system based on single-fiber laser-induced breakdown spectroscopy includes the following steps:

coupling and injecting, by the fiber coupler, laser into the single fiber and transmitting the injected laser to the LIBS probe to excite the shield of the arc-extinguishing chamber in the vacuum switch to induce generation of plasma;

enabling the plasma to be subjected to self-emission imaging and to enter the fiber coupler via the LIBS probe, separating, by the dichroscope, the laser from the plasma, and collecting, by the collection fiber, the plasma via the achromatic instrument;

triggering, by the digital delay pulse generator, the laser and the camera, adjusting a time interval to track the evolution of the plasma, and obtaining, by the camera and the spectrometer, a plasma image and a spectral signal; and generating, by the processor, a plasma temperature and a plasma density based on the plasma image and the spectral signal, so as to obtain a vacuum degree.

In the detection method, the spectral signal includes an ion spectral line composition and intensity.

Beneficial Effects

According to the present disclosure, feature parameters capable of representing the vacuum degree are acquired based on a plasma imaging system and spectral intensity analysis, so that live detection for the vacuum degree of a vacuum switch is achieved. Laser output from a mode fiber is divergent and needs to be focused by a lens. The single fiber is used for better detection. The single fiber is applicable to long-distance communication due to its small intermodal dispersion, and the signal distortion is extremely small; the laser transmitted via the single fiber acts on a target material, so that an obtained plasma image has high repeatability and high spectral signal-to-noise ratio, which avoids the requirement that a direct focusing center needs to be more concentrated, and solves the problems that traditional LIBS has poor laser pulse stability and high noise interference. The plasma generated by the laser transmitted by the fiber is more uniform and can produce more stable melting pits, and the self-absorption effect also shows a decline state, and it is impossible to generate greater peak irradiance due to a lower temperature and a lower electron density, so that high-intensity emission cannot be provided for the plasma. When a fiber is used as a transmission medium, the measurement process is safe and reliable. In a harsh environment and a nuclear radiation environment that is harmful to people, the online vacuum degree detection for switch equipment can achieve remote online monitoring and improve the work and maintenance efficiency.

The foregoing description is only an overview of the technical solutions of the present disclosure, in order to make the technical means of the present disclosure clearer to the extent that those skilled in the art can implement it in accordance with the content of the description, and in order to make the foregoing and other objectives, features and advantages of the present disclosure more obvious and understandable, the specific embodiments of the present disclosure will be described below.

BRIEF DESCRIPTION OF THE DRAWINGS

Various other advantages and benefits of the present disclosure will become apparent to those of ordinary skill in the art upon reading the detailed description in the preferred specific embodiments below. The accompanying drawings are only used for the purpose of illustrating the preferred embodiments, and are not considered as a limitation to the present disclosure. Obviously, the drawings described below are only some embodiments of the present disclosure. For those of ordinary skill in the art, other drawings can be obtained based on these drawings without creative work. Furthermore, throughout the drawings, the same reference numerals are used to denote the same parts.

In the drawings:

FIG. 2 is a flowchart of a detection method using the online vacuum degree detection system based on single-fiber laser-induced breakdown spectroscopy according to the present disclosure.

Figure 1:
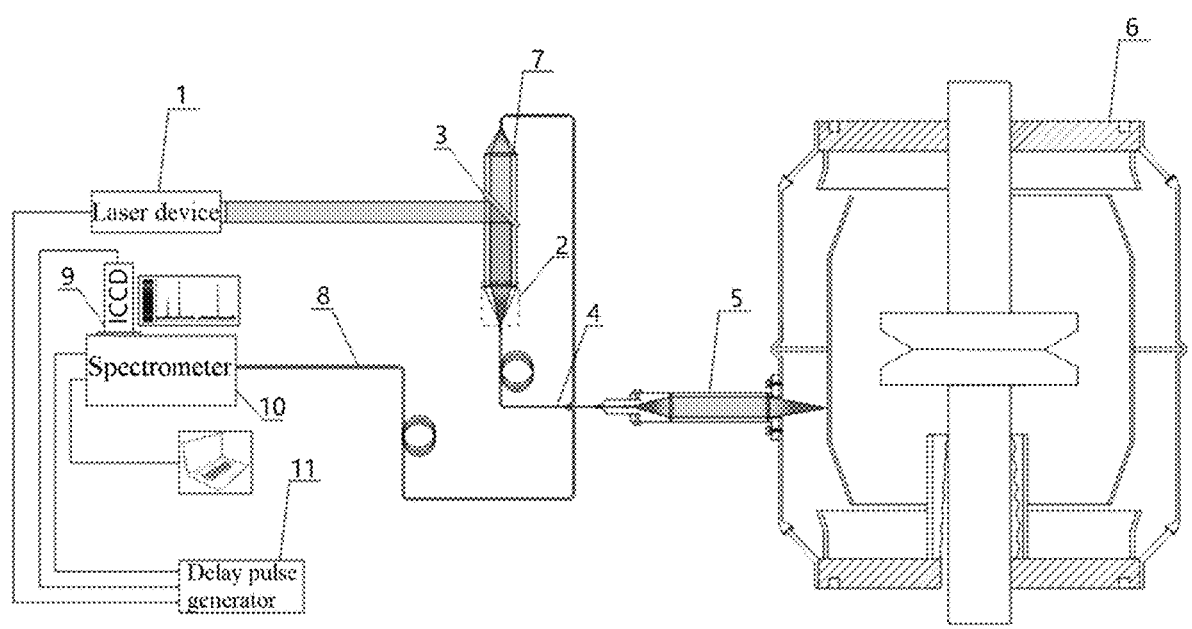
FIG. 1 is a structural schematic diagram of an online vacuum degree detection system based on single-fiber laser-induced breakdown spectroscopy according to the present disclosure.

The reference numerals in the drawings are as follows: 1: laser device; 2: fiber coupler; 3: dichroscope; 4: single fiber; 5: single-fiber LIBS probe; 6: vacuum arc-extinguishing chamber; 7: achromatic instrument; 8: collection fiber; 9: ICCD camera; 10: spectrometer; and 11: delay pulse generator.

The present disclosure will be further explained below in combination with the accompanying drawings and the embodiments.

DETAILED DESCRIPTION OF THE EMBODIMENTS

Specific embodiments of the present disclosure will be described in more detail below with reference to FIG. 1 to FIG. 2. Although specific embodiments of the present disclosure are shown in the drawings, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

It should be noted that certain words are used in the description and claims to refer to specific components. Those skilled in the art should understand that they may use different terms to refer to the same component. This description and claims do not use differences in terms as a way to distinguish components, but use differences in functions of components as a criterion for distinguishing. If "including" or "include" mentioned in the entire description and claims is an open term, it should be interpreted as "including but not limited to". The following description of the description is a preferred embodiment for implementing the present disclosure. However, the description is for the purpose of the general principles of the description and is not intended to limit the scope of the present disclosure. The protection scope of the present disclosure shall be subject to those defined by the appended claims.

In order to facilitate the understanding of the embodiments of the present disclosure, specific embodiments will be used as an example for further explanation in conjunction with the accompanying drawings, and the drawings do not constitute a limitation to the embodiments of the present disclosure.

As shown in FIG. 1, an online vacuum degree detection system based on single-fiber laser-induced breakdown spectroscopy (LIBS) includes:

a laser device 1, which generates laser that excites the laser through fiber induced breakdown spectroscopy;

a fiber coupler 2, which couples and injects the laser;

a single fiber 4, which is connected to the fiber coupler 2 to transmit the laser;

an LIBS probe 5, one end of which is connected to the single fiber 4, and the other end of which extends into a vacuum arc-extinguishing chamber 6, wherein the laser is induced by the LIBS probe 5 to generate plasma, and the plasma is subjected to self-emission imaging and enters the fiber coupler 2 via the LIBS probe 5;

a dichroscope 3, which is arranged on the fiber coupler 2 to separate the laser from the plasma;

an achromatic instrument 7, which is connected to the fiber coupler 2;

a collection fiber 8, which is connected to the achromatic instrument 7 to collect the plasma;

a spectrometer 10, which is connected to the collection fiber 8 to generate a spectral signal;

an ICCD camera 9, which is connected to the spectrometer 10 to collect a plasma image;

a digital delay pulse generator 11, which is connected to the ICCD camera 9 to control the ICCD camera 9 by means of setting a delay between pulses; and a processor, which is connected to the ICCD camera 9 and the spectrometer 10, wherein a plasma temperature and a plasma density are generated based on the plasma image and the spectral signal, so as to obtain a vacuum degree.

In a preferable embodiment of the online vacuum degree detection system based on single-fiber laser-induced breakdown spectroscopy, the energy of the laser generated by the laser device 1 is 24 mJ, and a wavelength is set to 1,064 nm.

In a preferable embodiment of the online vacuum degree detection system based on single-fiber laser-induced breakdown spectroscopy, a central glass core of the single fiber 4 has a core diameter of 400 μm-600 μm; a material of a core layer of the single fiber 4 adopts $GeO_2$ or $SiO_2$.

In a preferable embodiment of the online vacuum degree detection system based on single-fiber laser-induced breakdown spectroscopy, the LIBS probe 5 is a single-lens-based LIES laser probe; during focusing, laser spots are focused and emitted through a lens to a shield target material of an arc-extinguishing chamber in a vacuum switch to generate plasma.

In one embodiment, the system includes a laser device 1, a fiber coupler 2, a dichroscope 3, a transmission fiber, a single-fiber LIBS probe 5, a vacuum arc-extinguishing chamber 6, an achromatic instrument 7, a collection fiber 8, a digital delay pulse generator 11, a plasma imaging system, a spectrometer 10, and an ICCD camera 9.

In one embodiment, the laser device 1 is used for generating high-energy laser with an energy of 24 mJ; the fiber coupler 2 reflects a main laser beam through the dichroscope 3 and injects the reflected main laser beam into the transmission fiber; the single-fiber LIBS probe 5 includes a small laser probe applied to a single-lens-based single-fiber laser-induced breakdown spectroscopy system and is used for inducing generation of plasma; the plasma imaging system shall include a lens for achieving a focusing effect in the single-fiber 4 LIBS probe 5 and the dichroscope 3 for separating plasma emission from a laser path; the emitted plasma is returned according to an original path, is separated from the laser path through the dichroscope 3, and is transmitted by the achromatic instrument 7 to the collection fiber 8. The digital delay pulse generator 11 controls, for example, the ICCD camera 9 by setting a delay between pulses. The spectral measurement system is applied to detecting a spectral signal generated by the plasma, includes the ICCD camera 9 and the spectrometer 10, records the spectral signal and analyzes a spectral line composition, intensity, plasma temperature and plasma density to obtain a vacuum measurement result.

Preferably, due to a high laser flux of a focal plane, a fiber input end face is required to be placed at a proper distance behind a focus point, so as to ensure that the laser irradiance is less than a fiber damage threshold. Preferably, the distance between a fiber output end face and the lens is required to be considered. This is one of the factors that affect the size of a focused laser spot.

The present disclosure solves the problem of online monitoring of remote vacuum switch equipment. The noise interference during laser incidence is reduced through fiber transmission, so that the light loss is reduced, and the detection accuracy and efficiency are improved. Meanwhile, application scenarios of this application include, but are not limited to, an application to a power equipment switch, which is of great significance for predictability of the service life of a switch and an engineering type.

As shown in FIG. 2, a detection method using the online vacuum degree detection system based on single-fiber laser-induced breakdown spectroscopy includes the following steps:

the laser is coupled and injected into the single fiber 4 by the fiber coupler 2 and transmitted to the LIBS probe 5 to excite the shield of the arc-extinguishing chamber in the vacuum switch to induce generation of plasma;

the plasma is subjected to self-emission imaging and enters the fiber coupler 2 via the LIB S probe 5, the dichroscope 3 separates the laser from the plasma, and the collection fiber 8 collects the plasma via the achromatic instrument 7;

the digital delay pulse generator 11 triggers the laser and the camera 9, a time interval is adjusted to track the evolution of the plasma, and the camera 9 and the spectrometer 10 obtain a plasma image and a spectral signal; and the processor generates a plasma temperature and a plasma density based on the plasma image and the spectral signal, so as to obtain a vacuum degree.

In the detection method, the spectral signal includes an ion spectral line composition and intensity.

In one implementation, the online vacuum degree detection method includes the following steps: the laser device 1 generates high-energy laser; the laser is injected into the single fiber 4 for transmission to excite and induce the shield target material of the arc-extinguishing chamber in the vacuum switch; the output laser is focused by using an imaging principle; a laser spot on the fiber end face is imaged and mapped to a target surface through an aspherical lens to generate plasma. In this way, self-emission of the plasma is also imaged to an output end face of the fiber laser device 1 and the plasma is then transmitted back through the transmission fiber; the plasma emission is separated from the laser path via the dichroscope 3; the plasma is guided by the achromatic instrument 7 to be emitted into the collection fiber 8 which is connected to the spectral measurement system. The delay pulse generator 11 is used to trigger a laser source and the ICCD camera 9. The ICCD camera 9 is used to acquire an image of the plasma, and finally, a spectral signal result is analyzed to obtain a vacuum measurement numerical value.

In one implementation, the method includes:

Step 1, the laser device 1 is used to emit high-energy laser which is coupled and injected into the fiber for exciting the shield of the vacuum arc-extinguishing chamber 6 to generate plasma. The energy of the laser transmitted by the fiber is 24 mJ, and a wavelength is set to 1,064 nm, so as to ensure inducing generation of plasma to complete subsequent measurement of a vacuum degree.

Step 2, a main laser beam generated in the step 1 is injected into the transmission fiber through the laser fiber coupler 2 via the dichroscope 3, and the fiber used in an experiment is a single fiber 4.

Step 3, the laser transmitted by the fiber in the step 2 is focused inside the vacuum arc-extinguishing chamber 6 through the single-fiber 4 LIBS probe 5 to generate plasma converged into a point.

Step 4, the digital delay pulse generator 11 is configured to trigger the laser and the ICCD camera 9; a time interval is adjusted to track the evolution of the plasma or shock wave; the plasma generated in the step 3 is transmitted back through the ICCD camera 9 via the transmission fiber, is separated from the laser path through the dichroscope 3, and is transmitted to the collection fiber 8 which is connected to the spectral measurement system by the achromatic instrument 7; the ICCD is used for taking pictures; a filter is placed in front of the camera to filter plasma radiation and background noise to obtain a plasma image; and analysis is performed to obtain a vacuum degree.

In the online vacuum degree detection method based on single-fiber laser-induced breakdown spectroscopy, the single-fiber LIBS probe 5 is applied, and a single-fiber-based laser-induced plasma imaging system and a spectral diagnosis system are designed to achieve the online vacuum degree measurement method based on a single-fiber LIBS plasma imaging technology. The system includes a laser device 1, a fiber coupler 2, a dichroscope 3, a transmission fiber, a single-fiber LIBS probe 5, a vacuum arc-extinguishing chamber 6, an achromatic instrument 7, a collection fiber 8, a delay pulse generator 11, a plasma imaging system, and a spectral measurement system. According to the above step 1, the laser device 1 is used to generate high-energy laser, and the energy is set to 24 mJ; the fiber coupler 2 is used to reflect a main transmission beam into the transmission fiber through the dichroscope 3; the single-fiber LIBS probe 5 includes a small laser probe based on a single-lens-based single-fiber 4 laser-induced breakdown spectroscopy system for inducing generation of plasma; the achromatic instrument 7 is used to guide the plasma into the collection fiber 8; the digital delay pulse generator 11 controls the ICCD camera 9 by setting a delay between pulses; the plasma imaging system shall be provided with a lens for focusing and the dichroscope 3 for separating the laser from the plasma; the dichroscope 3 is used to reflect the laser and separate the plasma from the laser beam; the spectral measurement system shall include the ICCD camera 9 and the spectrometer 10 that complete the step 5, and are applied to detecting the spectral signal generated by the plasma, recording the spectral signal, analyzing the atom and ion spectral line compositions and intensities, and finally calculating a plasma temperature and a plasma density to obtain a vacuum measurement result.

Preferably, the laser device 1 can generate laser with an energy of 24 mJ and a wavelength of 1,064 nm; the energy of the laser with the specific wavelength can be transmitted through the fiber coupler 2 via the single fiber 4, and the energy of the laser transmitted by the single fiber 4 can induce, through the LIB S probe 5, the shield target material of the arc-extinguishing chamber in the vacuum switch to generate plasma. Preferably, the plasma is separated from the laser beam by the dichroscope 3 and transmitted to the collection fiber 8 by the achromatic instrument 7 for imaging via the ICCD camera 9. Preferably, the spectrometer 10 in the spectral measurement system can process different spectral lines of the plasma, including atomic lines and ion lines, and determine a vacuum degree through spectral line intensity analysis.

Although the embodiments of the present disclosure have been described above in conjunction with the accompanying drawings, the present disclosure is not limited to the above specific embodiments and application fields. The above specific embodiments are only illustrative and instructive, but not restrictive. Under the enlightenment of this description and without departing from the scope of protection of the claims of the present disclosure, those of ordinary skill in the art can also make many forms, which all fall within the protection of the present disclosure.

What is claimed is:

1. An online vacuum degree detection system based on single-fiber laser-induced breakdown spectroscopy, comprising:

a laser device, which generates laser that excites the laser through fiber induced breakdown spectroscopy, wherein the laser generated by the laser device has an energy of the laser 1 is 24 mJ, and has a wavelength of 1,064 nm;

a fiber coupler, which couples and injects the laser;

a single fiber, which is connected to the fiber coupler to transmit the laser, wherein a central glass core of the single fiber has a core diameter of 400 μm-600 μm; a material of a core layer of the single fiber adopts $GeO_2$ or $SiO_2$; and a material of a cladding layer of the single fiber adopts $SiO_2$;

a laser-induced breakdown spectroscopy (LIBS) probe, one end of which is connected to the single fiber, and the other end of which extends into a vacuum arc-extinguishing chamber, wherein the laser is conducted by the fiber and is induced by the LIBS probe to generate plasma, and the plasma is subjected to self-emission imaging and enters the fiber coupler via the LIBS probe, and the LIBS probe is a single-lens-based LIBS laser probe; during focusing, laser spots are focused and emitted through a lens to a shield target material of an arc-extinguishing chamber in a vacuum switch to generate the plasma;

a dichroscope, which is arranged on the fiber coupler to separate the laser from the plasma;

an achromatic instrument, which is connected to the fiber coupler;

a collection fiber, which is connected to the achromatic instrument to collect the plasma via the achromatic instrument;

a spectrometer, which is connected to the collection fiber to generate a spectral signal;

an intensified charged couple device (ICCD)-camera, which is connected to the spectrometer to collect a plasma image and further is used for taking pictures, wherein a filter is placed in front of the camera to filter plasma radiation and background noise to obtain a plasma image; and analysis is performed to obtain a vacuum degree;

a digital delay pulse generator, which is connected to the ICCD camera to control the ICCD camera by means of setting a delay between pulses and is configured to trigger the laser and the ICCD camera, wherein a time interval is adjusted to track evolution of the plasma;

a plasma imaging system, comprising the lens and being configured for achieving a focusing effect in the single-fiber, LIBS probe and the dichroscope for separating plasma emission from a laser path; and a processor, which is connected to the ICCD camera and the spectrometer, wherein a plasma temperature and a plasma density are generated based on the plasma image and the spectral signal, so as to obtain thea vacuum degree; wherein the laser is injected into the single fiber for transmission by the fiber coupler and transmitted to the LIBS probe to excite and induce a shield target material of the vacuum arc-extinguishing chamber;

the fiber coupler reflects a main laser beam through the dichroscope and injects the reflected main laser beam into the transmission fiber;

the plasma is subjected to self-emission imaging and enters the fiber coupler via the LIBS probe; the dichroscope separates the laser from the plasma and the collection fiber collects the plasma via the achromatic instrument;

an output of the laser is focused by using an imaging principle;

a laser spot on a fiber end face of the single fiber is imaged and mapped to a target surface through an aspherical lens to generate the plasma;

self-emission of the plasma is also imaged to an output end face of the fiber laser device and the plasma is then transmitted back through the single fiber;

emission of the plasma is separated from the laser path via the dichroscope; the plasma is guided by the achromatic instrument to be emitted into the collection fiber which is connected to the spectrometer;

the digital delay pulse generator is used to trigger a laser source and the ICCD camera; the ICCD camera is used to acquire an image of the plasma;

a spectral signal result is analyzed to obtain a vacuum measurement numerical value, thus achieving online monitoring of a remote vacuum switch equipment; and the laser starts from the laser device to the fiber coupler, the single fiber and single-fiber LIBS probe.

2. A detection method using the online vacuum degree detection system based on single-fiber laser-induced breakdown spectroscopy according to claim 1, wherein the method comprises the following steps:

coupling and injecting, by the fiber coupler, laser into the single fiber and transmitting the injected laser to the LIBS probe to excite the shield of the arc-extinguishing chamber in the vacuum switch to induce generation of plasma;

enabling the plasma to be subjected to self-emission imaging and to enter the fiber coupler via the LIBS probe, separating, by the dichroscope, the laser from the plasma, and collecting, by the collection fiber, the plasma via the achromatic instrument;

triggering, by the digital delay pulse generator, the laser and the camera, adjusting a time interval to track the evolution of the plasma, and obtaining, by the ICCD camera and the spectrometer, a plasma image and a spectral signal; and generating, by the processor, a plasma temperature and a plasma density based on the plasma image and the spectral signal, so as to obtain the vacuum degree.

3. The detection method according to claim 2, wherein the spectral signal comprises an ion spectral line composition and intensity.

\* \* \* \* \*